(12) United States Patent
Huddleston et al.

(10) Patent No.: US 12,571,347 B2
(45) Date of Patent: Mar. 10, 2026

(54) HEATER WITH CATALYTIC TESLA-TURBINE-BASED ELECTRICAL GENERATION AND INDEPENDENT SPOOLING

(71) Applicant: Liberator LLC, Bourbon, MO (US)

(72) Inventors: Sky Huddleston, Bourbon, MO (US);
Brady Gupton, Rolla, MO (US);
Timothy A. Balcer, Fredonia, AZ (US)

(73) Assignee: Liberator LLC, Bourbon, MO (US)

( * ) Notice: Subject to any disclaimer, the term of this patent is extended or adjusted under 35 U.S.C. 154(b) by 0 days.

(21) Appl. No.: 18/198,218

(22) Filed: May 16, 2023

(65) Prior Publication Data

US 2024/0384683 A1 Nov. 21, 2024

(51) Int. Cl.
| | |
|---|---|
| *F02C 6/18* | (2006.01) |
| *F02C 7/08* | (2006.01) |
| *F02C 7/24* | (2006.01) |
| *H02K 7/18* | (2006.01) |
| *H02K 11/00* | (2016.01) |

(52) U.S. Cl.
CPC .................. *F02C 6/18* (2013.01); *F02C 7/08* (2013.01); *F02C 7/24* (2013.01); *H02K 7/1823* (2013.01); *H02K 11/0094* (2013.01)

(58) Field of Classification Search
CPC ..... F02C 6/18; F02C 7/08; F02C 7/24; H02K 7/1823; H02K 11/0094
See application file for complete search history.

(56) References Cited

U.S. PATENT DOCUMENTS

| | | | | |
|---|---|---|---|---|
| 3,899,923 | A | * | 8/1975 | Teller .................... F01N 13/082 60/39.5 |
| 4,185,459 | A | * | 1/1980 | Holste ...................... F02C 6/00 60/777 |
| 2004/0128974 | A1 | * | 7/2004 | Laper ........................ F02C 5/02 60/39.6 |
| 2006/0187593 | A1 | * | 8/2006 | Mahawili ............... B82Y 15/00 361/20 |

(Continued)

FOREIGN PATENT DOCUMENTS

| | | | | |
|---|---|---|---|---|
| GB | 2541932 A | * | 3/2017 | ................ F02C 6/14 |
| WO | WO-2021243949 A1 | * | 12/2021 | ............... F01D 1/32 |
| WO | WO-2022122113 A1 | * | 6/2022 | ............. B01D 53/94 |

OTHER PUBLICATIONS

WO 2022122113 A1 English translation (Year: 2022).*

*Primary Examiner* — Viet P Nguyen
(74) *Attorney, Agent, or Firm* — Daniel Nelson; Nelson IP

(57) ABSTRACT

An apparatus includes a heater having a combustion chamber, an inlet port to provide fuel into the combustion chamber, and an outlet port to expel exhaust gases from the combustion chamber. The combustion chamber may be insulated. An exhaust channel is operably coupled to the outlet port and is configured to convey exhaust gases away from the combustion chamber. A nozzle, such as a de Laval nozzle, is incorporated into the exhaust channel and is configured to accelerate the exhaust gases through the exhaust channel. A tesla turbine is operably coupled to the exhaust channel and is configured to generate rotational power from the accelerated exhaust gases. In certain embodiments, disks of the tesla turbine are coated with a catalytic material to break apart unburned particles in the exhaust gases. A corresponding method is also disclosed.

17 Claims, 9 Drawing Sheets

(56)  References Cited

U.S. PATENT DOCUMENTS

| | | | | |
|---|---|---|---|---|
| 2018/0371994 A1* | 12/2018 | Himmelmann | ......... | F02C 7/228 |
| 2019/0280561 A1* | 9/2019 | Abramov | ............... | H02K 7/183 |
| 2021/0047963 A1* | 2/2021 | Conde | ....................... | B04C 3/06 |
| 2022/0275754 A1* | 9/2022 | Li | ............................. | F02C 6/00 |

* cited by examiner

106

400

402

404

HEATER WITH CATALYTIC TESLA-TURBINE-BASED ELECTRICAL GENERATION AND INDEPENDENT SPOOLING

BACKGROUND

Field of the Invention

This invention relates to radiant heating systems, and more particularly to rocket mass heaters that are able to generate electricity.

Background of the Invention

A rocket mass heater (RMH), also known as a rocket stove mass heater or stratified crossdraft combustion chamber, is a type of slow-release radiant heating system. This type of heater traces its heritage to the gasogens and gassers used in motor vehicles throughout Europe during the fuel shortages of the 20th century. The underlying technology was later incorporated into masonry heaters by Ianto Evans of the Cobb Cottage Co. who modified Dr. Larry Winiarsky's J-tube style stratified crossdraft combustion chamber for use as a household heater. Various people and entities have since propagated the use of rocket heaters by distributing "do it yourself" (DIY) guides for hobbyists. Since that time, DIY rocket mass heaters have gained viral attention through the Internet particularly on self-sufficient living and homesteading forums.

Rocket mass heaters have been used primarily to provide heat to people with the secondary use of warming areas in a line of sight around the heater, particularly in residential and commercial buildings. Variations of the rocket mass heater have also been used for cooking, heating water, and producing warm air for distribution. Most designs for rocket mass heaters include an insulated combustion chamber where fuel is burned at high temperature and efficiency. A large thermal mass is typically placed in contact with gases emitted from the rocket mass heater to absorb most of the heat before the gases are exhausted to the atmosphere. Although estimates vary, some estimate that rocket mass heaters can reduce fuel consumption by as much as 80 to 90 percent compared to conventional wood-burning stoves.

Due to their high efficiency, rocket mass heaters have potential to reduce heating costs in residential and/or commercial buildings due to the amount of fuel that is saved. Yet improvements are still needed. For example, it would be an advance in the art to provide rocket mass heaters that can utilize a wide variety of fuel types, including wood chips and other agricultural waste products that are plentiful and have significant energy potential. Other secondary uses, such as electricity production, would significantly improve and provide additional utility to rocket mass heaters currently on the market. With environmental impacts increasingly considered across all types of devices, it would be a further advance to reduce emissions from rocket mass heaters even though rocket mass heaters are already known to significantly reduce harmful emissions compared to other types of stoves. It would be a further advance to provide a rocket mass heater with increased heat output and efficiency without a corresponding increase in emissions.

SUMMARY

The invention has been developed in response to the present state of the art and, in particular, in response to the problems and needs in the art that have not yet been fully solved by currently available rocket mass heaters. Accordingly, a new heater and associated method has been disclosed. The features and advantages of various embodiments of the invention will become more fully apparent from the following description and appended claims, or may be learned by practice of the invention as set forth hereinafter.

Consistent with the foregoing, an apparatus is disclosed. The apparatus includes a heater having a combustion chamber, an inlet port to provide fuel into the combustion chamber, and an outlet port to expel exhaust gases from the combustion chamber. The combustion chamber may be insulated. An exhaust channel is operably coupled to the outlet port and is configured to convey exhaust gases away from the combustion chamber. A nozzle, such as a de Laval nozzle, is incorporated into the exhaust channel and is configured to accelerate the exhaust gases through the exhaust channel. A tesla turbine is operably coupled to the exhaust channel and is configured to generate rotational power from the accelerated exhaust gases. In certain embodiments, disks of the tesla turbine are coated with a catalytic material to break apart unburned particles in the exhaust gases.

In certain embodiments, the apparatus includes an electrical generator that is coupled to the tesla turbine to produce electricity. A battery may, in certain embodiments, be included in the apparatus to store the electricity. Similarly, the apparatus may include a compressor to force air into and pressurize the combustion chamber. In certain embodiments, energy in the battery is used to power the compressor, and more particularly to power a motor that rotates the compressor. This enables the tesla turbine and compressor to be rotated independently from one another, thereby providing various advantages.

A corresponding method is also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
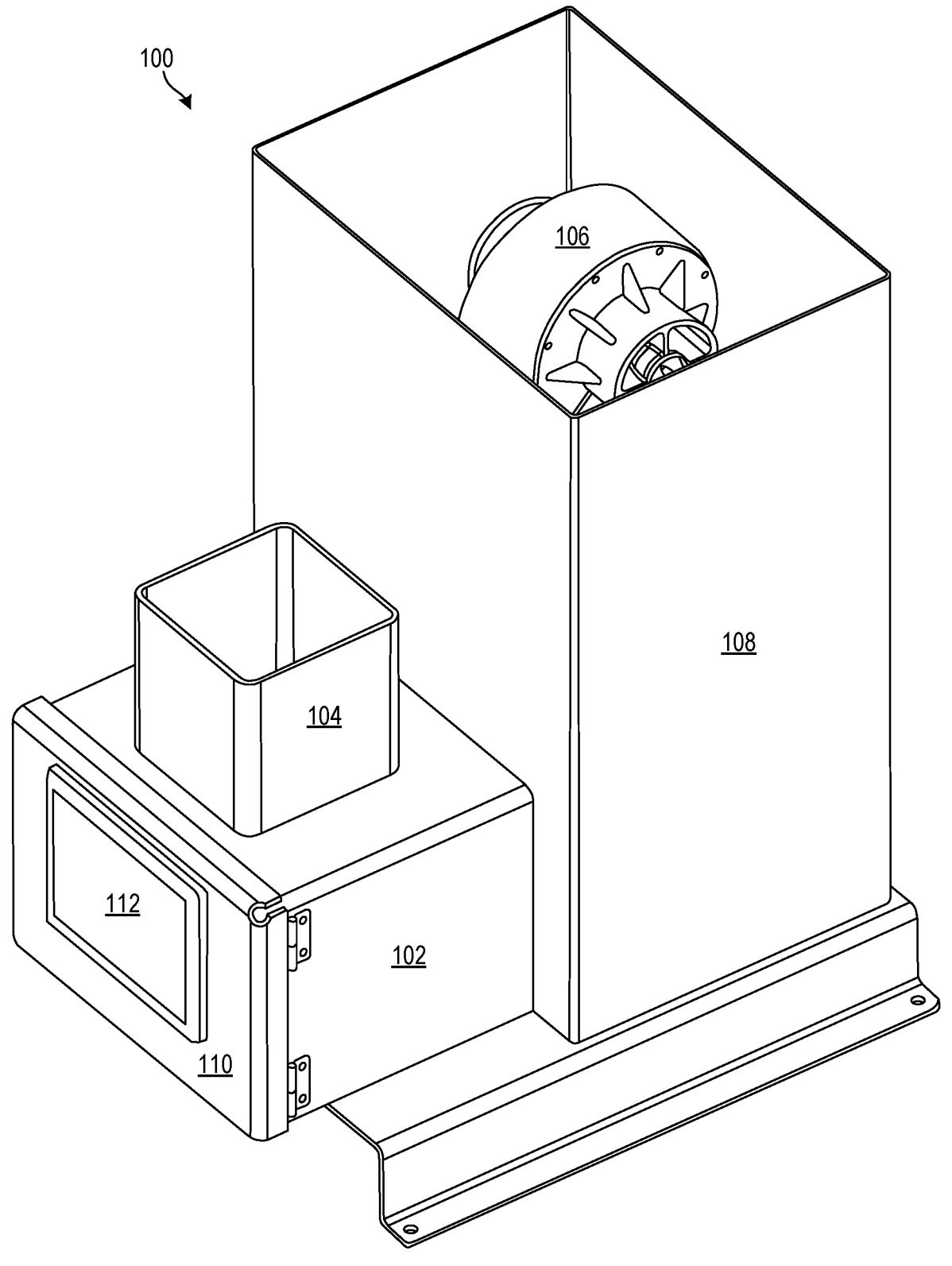
FIG. 1 is a perspective view showing one embodiment of a heater in accordance with the invention.
Figure 2:
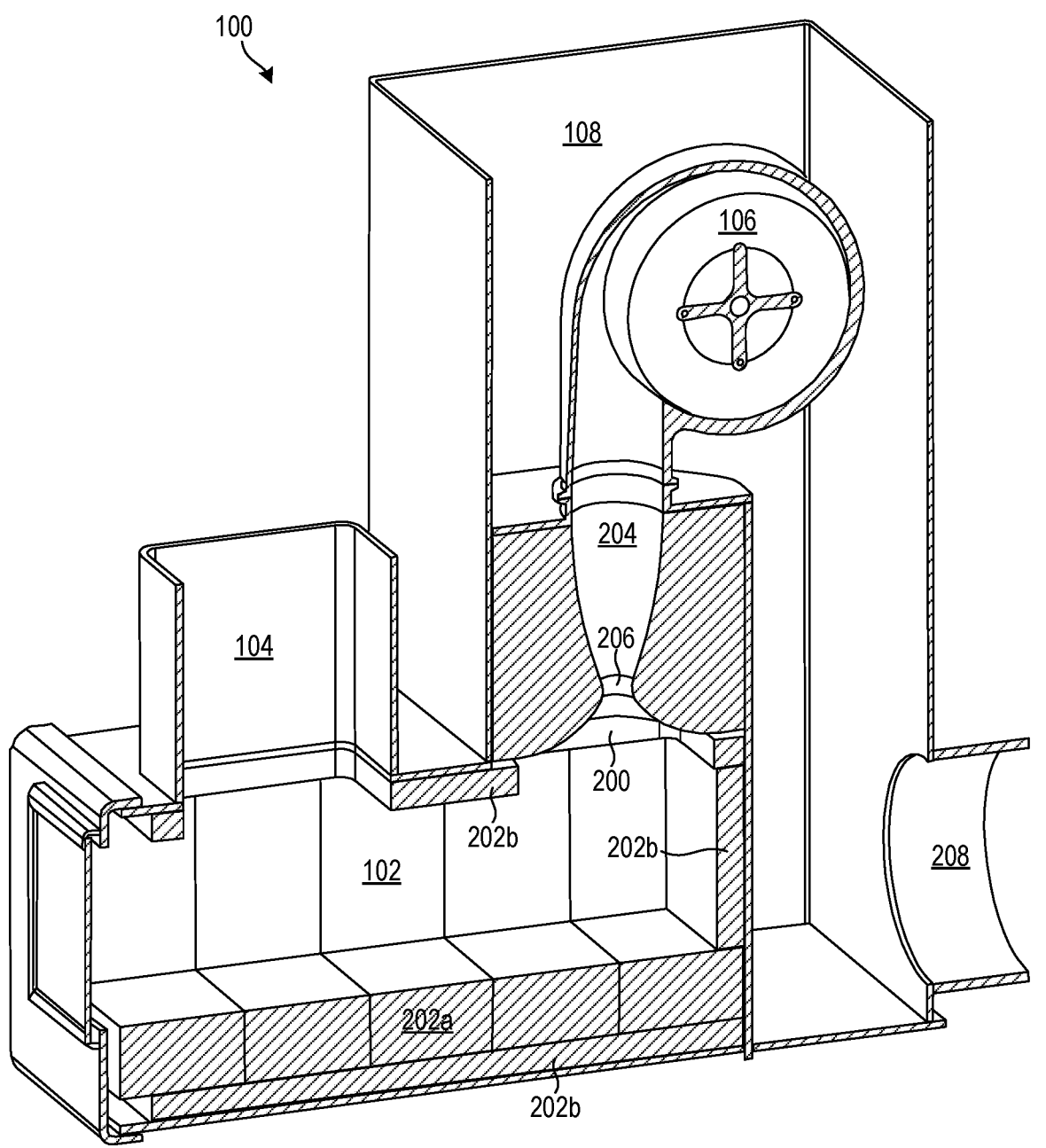
FIG. 2 is a perspective cutaway view of the heater of FIG. 1, showing various internal components of the heater.

Referring to FIGS. 1 and 2, various views of one embodiment of a heater 100 in accordance with the invention are shown. FIG. 1 is a perspective view showing an exterior of the heater 100 and FIG. 2 is a perspective cutaway view showing various components inside the heater 100. Various components (e.g., hopper, compressor, etc.) have been removed or are not shown for illustration purposes.

As shown, the heater 100 includes a combustion chamber 102, an inlet port 104 to provide fuel and air into the combustion chamber 102, and an outlet port 200 to expel exhaust gases from the combustion chamber 102. As shown, the combustion chamber 102 is internally covered with insulation 202. For example, in one embodiment, the combustion chamber 102 is insulated with several (e.g., 1-3) inches of firebrick 202a, backed by several (e.g., 1 to 2) inches of refractory fiberboard 202b. The insulation 202 may reduce the warmup time of the heater 100 considerably. This may, in turn, enable the heater 100 to quickly reach an operating temperature sufficient to reduce emissions of the heater 100, as will be explained in more detail hereafter. Beneficially, the insulation 202 may also provide sound insulation to reduce noise, such as high-frequency noise, emanating from the heater 100.

An exhaust channel 204 is operably coupled to the outlet port 200 and is configured to convey exhaust gases away from the combustion chamber 102 and into a heat exchange chamber 108. A nozzle 206, such as a de Laval nozzle 206, is incorporated into the exhaust channel 204. This nozzle 206 is configured to accelerate the exhaust gases passing through the exhaust channel 204. A tesla turbine 106 is operably coupled to the exhaust channel 204 and is configured to generate rotational power from the accelerated exhaust gases. As will be explained in more hereafter, in certain embodiments, disks of the tesla turbine 106 are coated with a catalytic material to break apart unburned particles in the exhaust gases that flow through the exhaust channel 204.

The heat exchange chamber 108 may receive the exhaust gases from the tesla turbine 106. Heat may be transferred from the exhaust gases through the walls of the heat exchange chamber 108 into an edifice or other space in which the heater 100 is located. In certain embodiments, the heat exchange chamber 108 as well as the combustion chamber 102 and other components of the heater 100 are fabricated from steel or other suitable materials that have adequate strength, durability, heat transfer properties, and the ability to withstand the temperatures of the heater 100. In certain embodiments, the combustion chamber 102 as well as other components of the heater 100 are outfitted with a door (such as a front access door 110) to facilitate cleaning of the chambers or access to components or objects therein. In certain embodiments, the front access door 100 may be equipped with a glass panel 112 to facilitate viewing materials or activity inside the combustion chamber 102. The heat exchange chamber 108 may, in certain embodiments, be equipped with a removable top (not shown) to provide access to the heat exchange chamber 108 and components therein.

The exhaust gases may exit the heat exchange chamber 108 and the heater 100 through an exhaust port 208. When forcing air into the heater 100 using a compressor (which will be explained in more detail hereafter) or other means, the exhaust gases may flow through the exhaust port 208 without the need for a tall chimney. This may enable the heater 100 to be installed in a home or other edifice using only an exhaust thimble through a wall. This significantly reduces the costs of installing the heater 100 in a home or other edifice.

Figure 3:
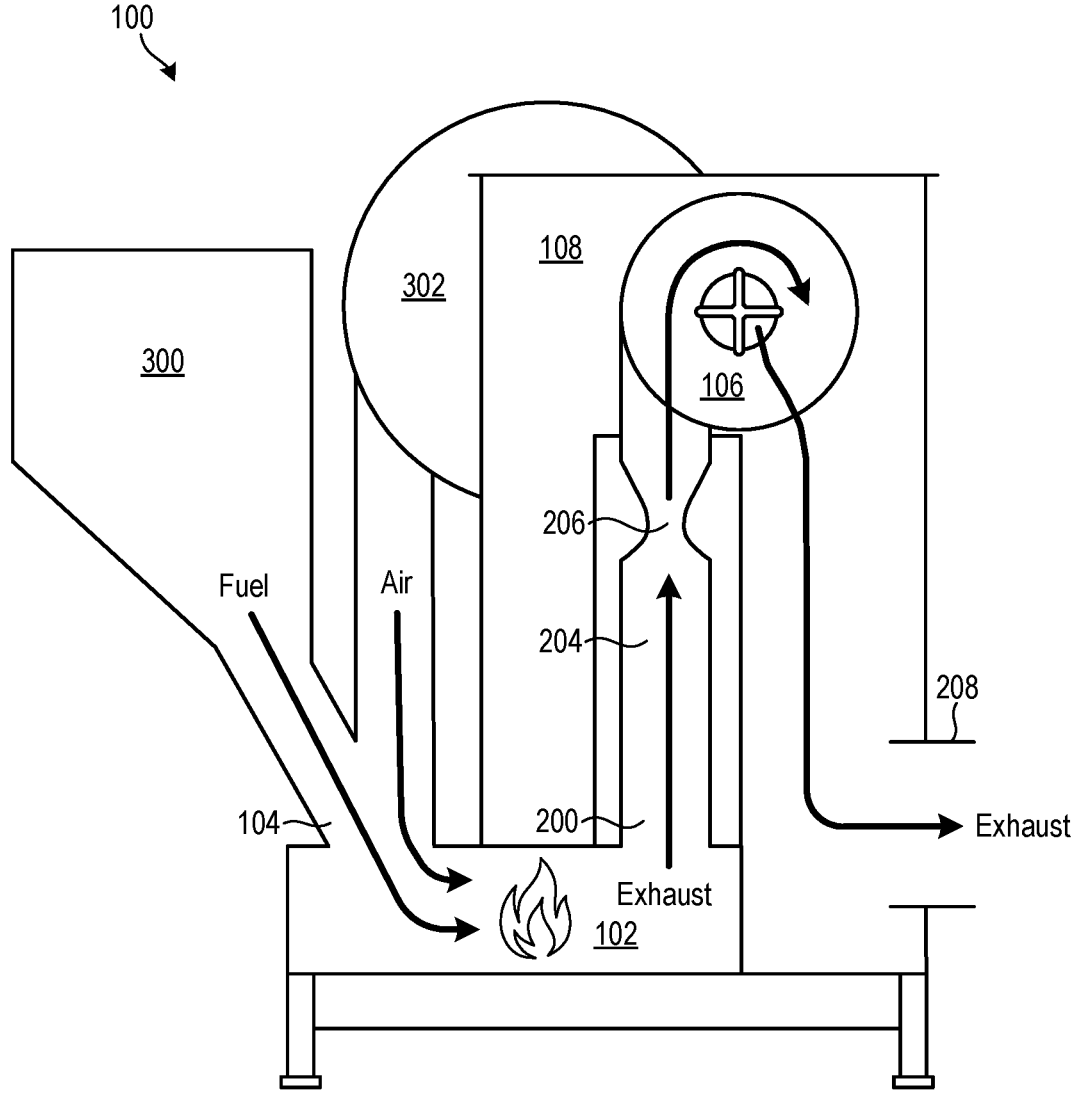
FIG. 3 is a high-level schematic view of one embodiment of a heater in accordance with the invention.

Referring to FIG. 3, a high-level schematic view of one embodiment of a heater 100 in accordance with the invention is illustrated. As shown, the heater 100 includes a hopper 300 to store fuel for input into the combustion chamber 102 through the inlet port 104. The fuel may include not only cordwood and wood pellets, but also wood chips, sawdust, agricultural waste, cherry or other fruit pits, leaves, stalks, and other overlooked fuel sources. Woodchips and agricultural waste are among the largest sources of waste biomass that are frequently discarded in landfills. Thus, the illustrated heater 100 may have the ability to burn various types of biomass waste products that are cheap and plentiful. The heater's ability to cleanly and reliably burn wood chips has the potential to save a significant number (e.g., 40) of trees per year compared to using cordwood. It is worth noting that wood chips left in landfills release methane while they degrade. This methane has roughly twenty-five times more global warming potential (GWP) than carbon dioxide. Wood chips also offer a much more cost-effective form of heating as they are freely given away by tree trimming service companies and municipal governments.

It is also worth noting that the heater 100 is not limited to burning biomass, but may also burn products such as coal, charcoal, crumb rubber, tires, plastics and the like. Furthermore, in certain embodiments, injectors may also be integrated into the combustion chamber 102 to inject fuel such methane, natural gas, propane, fuel oil, kerosene, or the like. This may be beneficial for ignition, startup, and even continuous operation with or without a solid fuel. This may be used to reduce the warmup time and consequently reduce emissions. It may also be used for remote and automatic startup, and may be used as an alternative/backup to solid fuel operation in the event that solid fuel runs out or is not available.

In certain embodiments, the hopper may be sized to feed the heater 100 with fuel for at least forty-eight hours when the heater 100 is operated on a low fuel consumption setting. Use of a large hopper reduces the loss of heat and the increase in emissions that may occur when refueling the heater 100. The downdraft produced by the heater 100 into the combustion chamber 102 may pre-heat and pre-dry incoming fuel as gravity pulls the fuel into the combustion chamber 102.

As shown, the combustion chamber 102 may, in certain embodiments, be pressurized with forced induction using a compressor 302, such as a centrifugal compressor 302. In certain embodiments, the compressor 302 is directly powered by the tesla turbine 106. In other embodiments, the compressor 302 is powered by an electrical motor. In certain embodiments, the electrical motor is powered by a battery (now shown) incorporated into the heater 100. In other embodiments, externally provided electricity may be used to power the compressor 302 until the tesla turbine 106 and associated generator produces enough electricity to power the compressor 302. Enabling independent rotation of the tesla turbine 106 and compressor may allow the tesla turbine 106 and compressor 302 to rotate at different speeds, and the speeds of the turbine 106 and compressor 306 may change dynamically to maximize efficiency across all operating modes. This feature may be used to optimize the performance of the heater 100 and achieve low emissions during ignition, startup, low temperature settings, and burnout to achieve consistently low emissions across all modes of operation of the heater 100 and in different environments.

As shown in FIG. 3, once fuel combusts under pressure in the combustion chamber 102, exhaust gases and other combustion products may be routed through the outlet port 200 and into the exhaust channel 204. These exhaust gases may be forced through a nozzle 206, such as a de Laval nozzle 206, to accelerate the gases. In certain embodiments, the nozzle 206 is fabricated from a castable refractory material (e.g., zirconia, alumina) that is rated for several thousand degrees (e.g., 3300 degrees Celsius) to enable the nozzle 206 to withstand the high temperatures of the exhaust gases and other combustion products. The accelerated exhaust gases that exit the nozzle 206 may then be used to power the tesla turbine 106. The tesla turbine 106 may be used to rotate a generator (not shown) to produce electricity. The exhaust gases may then exit the tesla turbine 106 into the heat exchange chamber 108. After significant heat energy has been extracted from the exhaust gases inside the heat exchange chamber 108, the gases may exit the heater 100 through the exhaust port 208.

Figure 4:
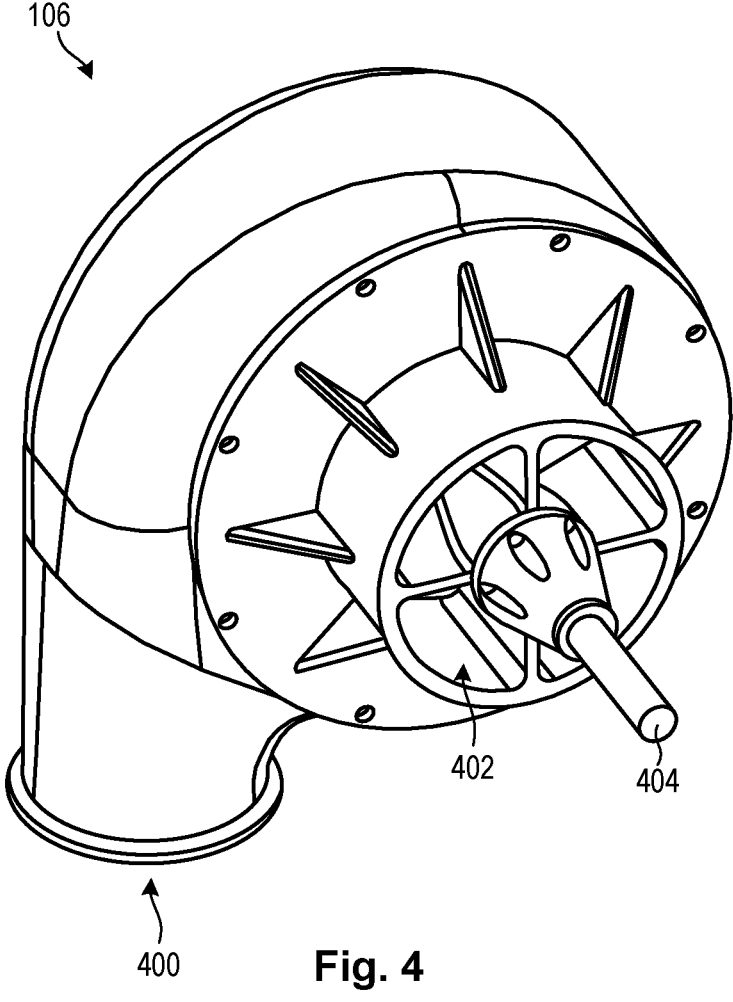
FIG. 4 is a perspective view showing one embodiment of a tesla turbine in accordance with the invention.

Referring to FIG. 4, a perspective view of one embodiment of a tesla turbine 106 is illustrated. As shown, the tesla turbine 106 may include an inlet 400 and an outlet 402. Exhaust gases may enter the inlet 400 and exit through the outlet 402. Inside the tesla turbine 106, the exhaust gases may pass through a set of closely spaced disks (not shown) rotating on a shaft 404. The exhaust gases generate a drag on the disks which causes the disks to spin. This rotates the shaft 404 to produce rotational power. The exhaust gases take a spiral path within the tesla turbine 106 until they exit through the center outlet 402.

Figure 5:
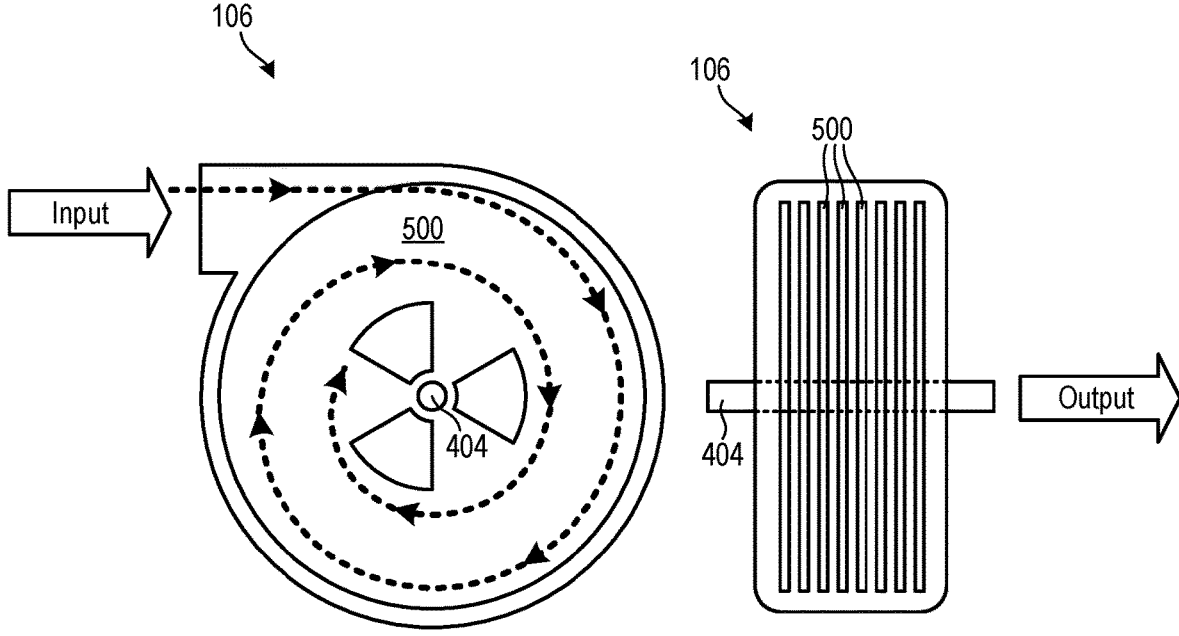
FIG. 5 is a high-level schematic view showing internal workings of a tesla turbine in accordance with the invention.

FIG. 5 is a high-level schematic view showing internal workings of a tesla turbine 106 in accordance with the invention. The left side of FIG. 5 shows a high-level side view of the tesla turbine 106, and the right side of FIG. 5 shows a high-level view of the spinning disks of the tesla turbine 106 in a direction parallel to the disks 500. As shown, the exhaust gases may enter the tesla turbine 106 and flow between the disks 500 to create drag on the disks 500, thereby causing the disks to rotate. Due to the rotation of the disks, the exhaust gases will take a more circuitous path through the tesla turbine 106 before exiting the tesla turbine 106 at or near the shaft 404. For example, the exhaust gases may take a generally spiral path through the tesla turbine 106 before exiting the tesla turbine 106.

Due to the circuitous path they take, the exhaust gases may touch or contact a significant amount of disk surface area before exiting the tesla turbine 106. This characteristic may be used advantageously. For example, in certain embodiments, the disks 500 of the tesla turbine 106 may be plated or otherwise coated with a catalytic material such as platinum, nickel, and/or palladium. This catalytic material may interact with the exhaust gases to break apart any unburned particles in the exhaust gases, as well as reduce emissions such as carbon monoxide, nitrogen oxides, hydrocarbons, and the like. Thus, the tesla turbine 106 may, in certain embodiments, be configured to operate as a catalytic combustor. Furthermore, the centripetal forces of the spinning of the disks may prevent ash or other combustion products from building up on the catalytic combustor. This may prevent clogging that has historically frustrated attempts to integrate commercially available catalytic technologies into heaters. In short, a tesla turbine 106 is particularly well suited to multi-phase motive fluid flows where particulates entrained in a flow would otherwise be detrimental and damaging to conventional bladed turbines.

Furthermore, coating the disks 500 of the tesla turbine 106 with catalytic materials may also increase the disks 500 overall strength by offering integral resistance to twinning and molecular slip of the disks' grain structure. A tesla turbine 106 may endogenously start via fluid flow and heat addition and is uniquely suited to solid fuels because it is virtually impervious to ash contamination that would otherwise induce unacceptable wear rates in impulse type turbine designs. These factors combine to create a new architecture for a catalytic combustor that is anticipated to yield very low emissions.

In certain embodiments in accordance with the invention, the tesla turbine 106 is configured to produce over 1 kilowatt of continuous electrical power. The heater 100, by contrast, is projected to generate between 80,000 and 120,000 BTUs, which is equal to 35.168 KWth. At a conservative three percent efficiency, the tesla turbine 106 may still produce over 1,000 watts of electrical power. Importantly, tesla turbines tend to be around forty percent efficient in practice.

Conventional catalytic stoves typically bypass their catalytic combustors during ignition and warm-up, leading to a longer time frame between ignition and light-off of the catalytic materials. Because the heater 100 described herein may heat up quickly, in certain embodiments, combustion gases may be routed directly through the catalytic discs of the tesla turbine 106 from the beginning of operation. This will cause the disks to heat up more quickly, thereby reducing the time required for light-off and decreasing overall emissions from the heater 100.

It is worth noting that most adjustable pellet wood heaters on the market operate with a carbon monoxide emissions output of between 250 to nearly 1,400 PPM. This indicates that conventional pellet burning heaters are not fully combusting carbon monoxide into carbon dioxide, thereby leading to inefficiencies. The inventor of the disclosed embodiments has found through experimentation that adding refractory insulation, pre-heating baffles, and catalytic combustors to the heater 100 consistently reduce carbon monoxide emissions to as low as 5 PPM when burning pellets and lower than 10 PPM when burning cordwood. The lower carbon monoxide PPM emissions can be taken as a proxy for a decrease in particulate matter emissions as both are driven by higher combustion temperatures.

Figure 6:
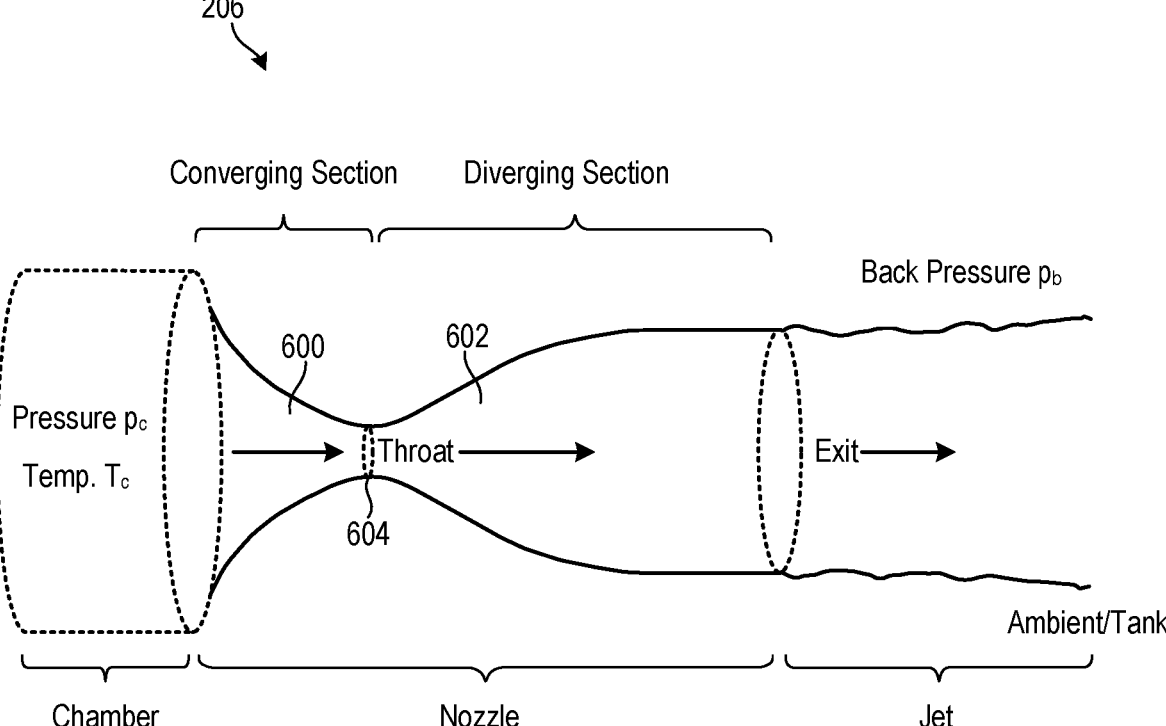
FIG. 6 is a high-level view showing a nozzle used to accelerate gases through the exhaust channel.

Referring to FIG. 6, a schematic of one embodiment of a nozzle 206, and more specifically a de Laval nozzle 206, is illustrated. As shown, the de Laval nozzle 206 includes a converging section 600, a diverging section 602, and a throat 604. The nozzle 206 may be used to accelerate the exhaust gases or other combustion products passing through the exhaust channel 204 before reaching the tesla turbine 1060. For example, an under-expanded converging-diverging de Laval nozzle 206 may be used to convert some of the thermal energy of the combustion gases into kinetic energy by accelerating the combustion gases to supersonic velocity in order to drive the tesla turbine 106. As previously mentioned, the de Laval nozzle 206 may, in certain embodiments, be fabricated from a castable refractory material that is rated for very high temperatures. In certain embodiments, a converging portion of the de Laval nozzle 206 may be a hyperbolic Schauberger funnel to induce a vortex to better homogenize the combustion gases before entering a narrow (e.g., one inch) diameter sonic throat 604 of the nozzle 206. In certain embodiments, shock diamonds may be used to promote more complete combustion.

The accelerated exhaust gases generated by the de Laval nozzle 206 may enable the tesla turbine 106 to operate at high RPMs where efficiency is maximized. Furthermore, the de Laval nozzle 206 may cool the exhaust gases to prevent the degradation of the catalytic materials in the tesla turbine 106. Notably, poor nozzle design may be a primary source of efficiency loss in a tesla turbine 106. As such, in certain embodiments, computational fluid dynamics may be used to determine a nozzle geometry with suitable characteristics. In certain embodiments, the inside of de Laval nozzle 206 itself may be coated with catalytic materials to further interact with the exhaust gases to break apart any unburned particles therein.

In certain embodiments, preheated or ambient temperature water may be injected (in the form of a spray, for example) at or near a throat of the nozzle 206, in the stream output from the nozzle 206, or in the combustion chamber 102 itself. This may accomplish several things. First, it may reduce the temperature of the exhaust gases if the exhaust gases prove to be too hot for the tesla turbine 106. This will ideally increase the life of the tesla turbine 106. Second, the water may flash to steam and the steam may assist in driving the tesla turbine 106, in effect creating an internal combustion gas-steam hybrid turbine. The moisture may optionally be recaptured from the heater's final exhaust and distilled and pumped back into the system for reuse.

Figure 7:
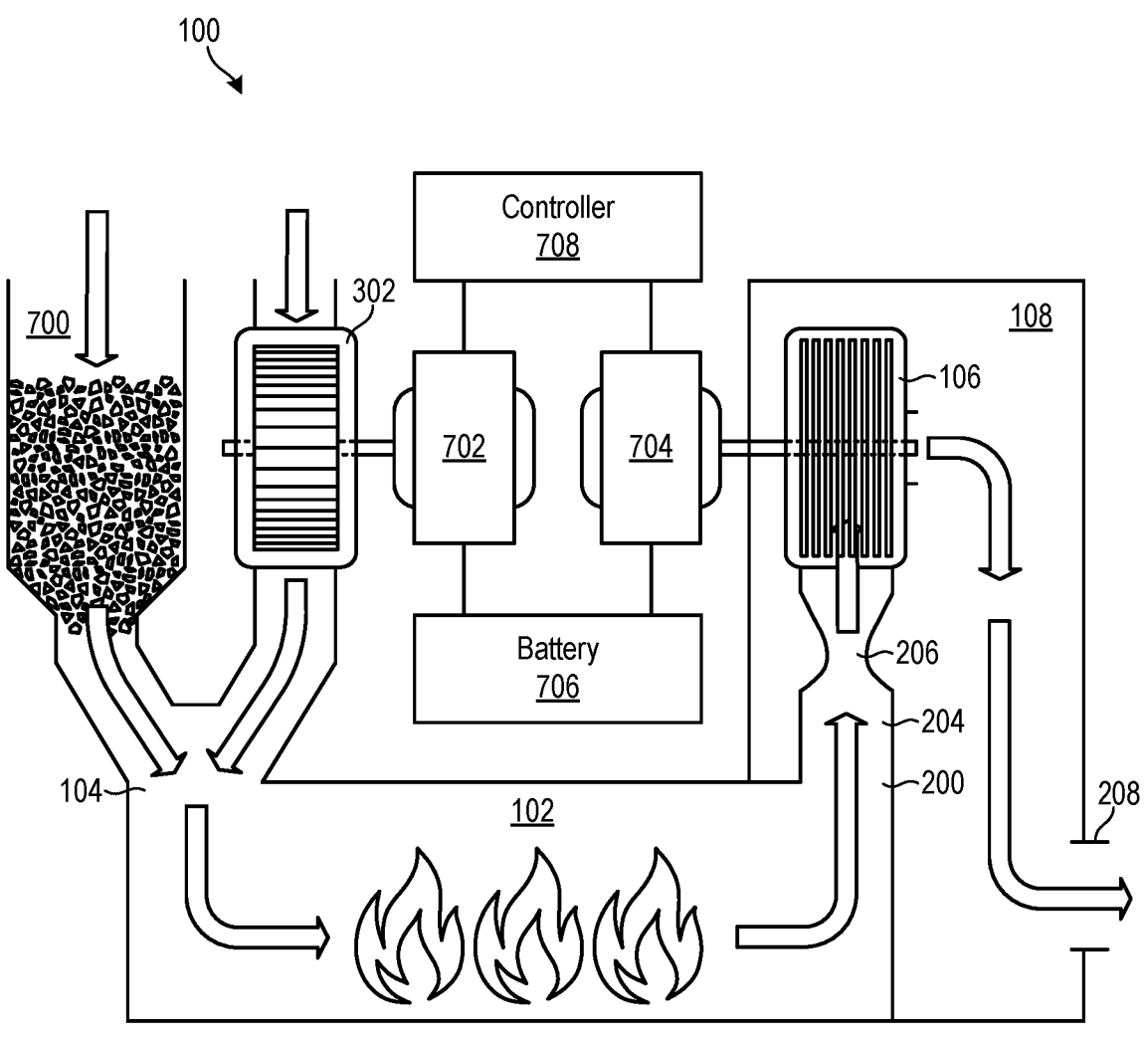
FIG. 7 is a high-level schematic block diagram showing exemplary function and operation of a heater in accordance with the invention.

Referring to FIG. 7, a high-level schematic block diagram showing possible function and operation of a heater 100 in accordance with the invention is illustrated. As shown, the heater 100 may include a hopper 700, compressor 302, motor 702, generator 704, tesla turbine 106, combustion chamber 102, heat exchange chamber 108, and battery 706. Further shown are the inlet port 104, outlet port 200, exhaust channel 204, de Laval nozzle 206, and outlet port 200. As shown in FIG. 7, in certain embodiments, the tesla turbine 106 may be used to power the generator 704. This generator 704 may, in certain embodiments, be used to directly power the compressor 302.

Alternatively, the generator 704 may be used to charge a battery 706 that may then be used to power the motor 702 and compressor 302. This allows the tesla turbine 106 and compressor 302 to operate independently and dynamically, as was previously explained. In certain embodiments, a controller 708 may be used to control the operation of the motor 702, generator 704, battery 706, and other components of the heater 100, such as a supply of fuel from the hopper 700, for example. In certain embodiments, the controller 708 may communicate with external networks and components to enable external control of the heater 100, enable external establishment or modification of settings or other configurations of the heater 100, and/or to report or provide feedback of a current or past status or settings of the heater 100 to an external location.

Figure 8:
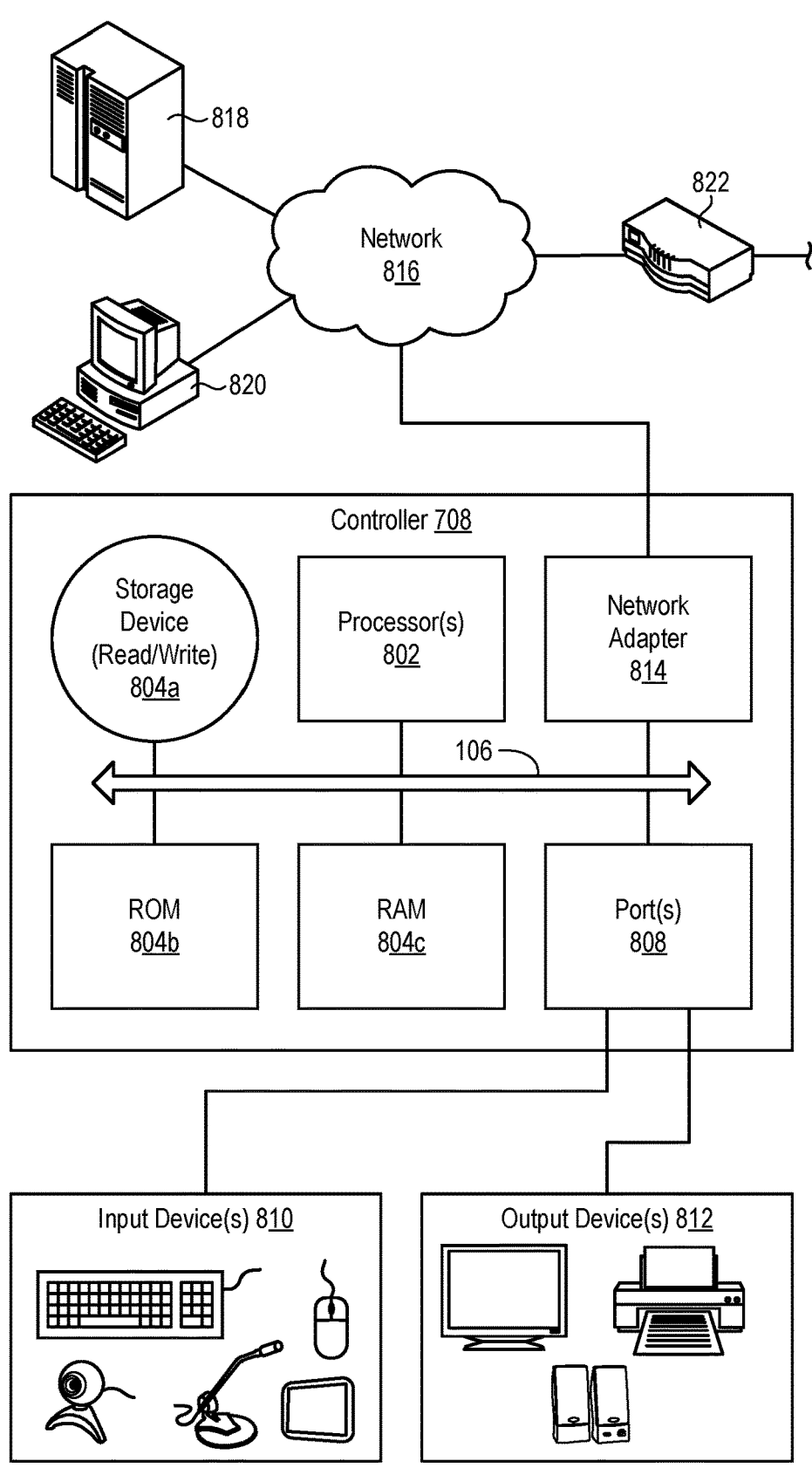
FIG. 8 is a high-level block diagram showing one embodiment of a controller that may be used to control various aspects of a heater in accordance with the invention.

Referring to FIG. 8, one example of a controller 708 is illustrated. The controller 708 is presented by way of example and is not intended to be limiting. Indeed, the systems and methods disclosed herein may be applicable to a wide variety of different controllers or computing systems in addition to the controller 708 shown. The systems and methods disclosed herein may also potentially be distributed across multiple controllers 708 or computing systems.

As shown, the controller 708 includes at least one processor 802 and may include more than one processor 802. The processor 802 may be operably connected to a memory 804. The memory 804 may include one or more non-volatile storage devices such as hard drives 804a, solid state drives 804a, CD-ROM drives 804a, DVD-ROM drives 804a, tape drives 804a, or the like. The memory 804 may also include non-volatile memory such as a read-only memory 804b (e.g., ROM, EPROM, EEPROM, and/or Flash ROM) or volatile memory such as a random access memory 804c (RAM or operational memory). A bus 806, or plurality of buses 806, may interconnect the processor 802, memory devices 804, and other devices to enable data and/or instructions to pass therebetween.

To enable communication with external systems or devices, the controller 708 may include one or more ports 808. Such ports 808 may be embodied as wired ports 808 (e.g., USB ports, serial ports, Firewire ports, SCSI ports, parallel ports, etc.) or wireless ports 808 (e.g., Bluetooth, IrDA, etc.). The ports 808 may enable communication with one or more input devices 810 (e.g., keyboards, mice, touchscreens, cameras, microphones, scanners, storage devices, etc.) and output devices 812 (e.g., displays, monitors, speakers, printers, storage devices, etc.). The ports 808 may also enable communication with other controllers or computing systems 800.

In certain embodiments, the controller 708 includes a wired or wireless network adapter 814 to connect the controller 708 to a network 816, such as a local area network (LAN), wide area network (WAN), storage area network (SAN), or the Internet. Such a network 816 may enable the controller 708 to connect to or communicate with one or more servers 818, workstations 820, personal computers 820, mobile computing devices, or other devices. The network 816 may also enable the controller 708 to connect to or communicate with another network by way of a router 822 or other device 822. Such a router 822 may allow the controller 708 to communicate with servers, workstations, personal computers, or other devices located on different networks.

Figure 9:
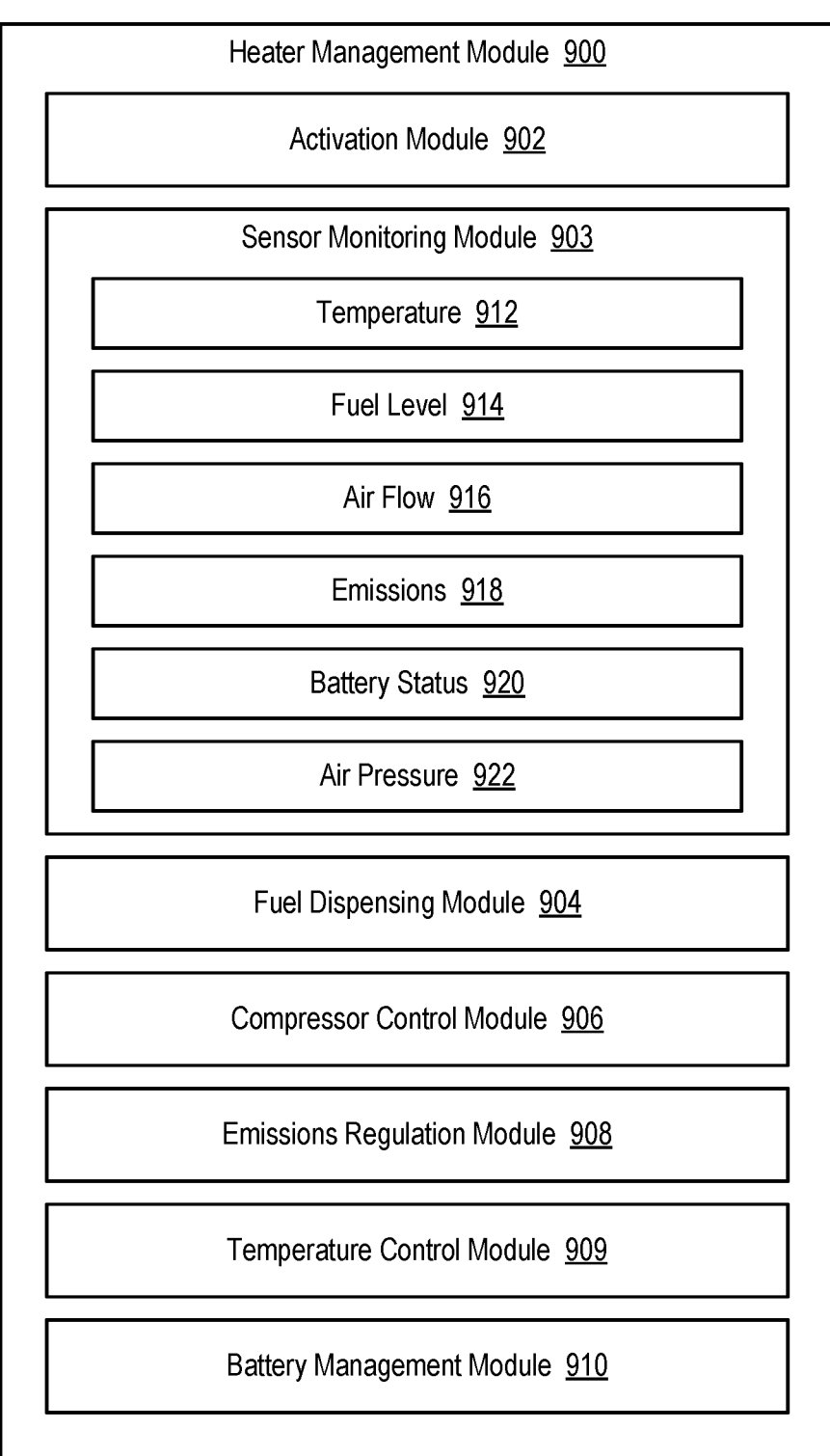
FIG. 9 is a high-level block diagram showing a heater management module and various sub-modules that may be implemented within the controller or external devices to control various aspects of the heater.

Referring to FIG. 9, in selected embodiments, a heater management module 900 may be used to manage various aspects of the heater 100. A high-level block diagram showing the heater management module 900 and various associated sub-modules is illustrated. The heater management module 900 and associated sub-modules may be implemented in hardware, software, firmware, or combinations thereof. The heater management module 900 and associated sub-modules are presented by way of example and not limitation. More or fewer sub-modules may be provided in different embodiments. For example, the functionality of some sub-modules may be combined into a single or smaller number of sub-modules, or the functionality of a single sub-module may be distributed across several sub-modules.

As shown, in one embodiment, the heater management module 900 may include one or more of an activation module 902, sensor monitoring module 903, fuel dispensing module 904, compressor control module 906, emissions regulation module 908, temperature control module 909, and battery management module 910. The modules may be implemented in the controller 708, in functionality external to the controller 708, or a combination thereof.

The activation module 902 may be configured to turn the heater 100 on or off. In certain embodiments, this may be as simple as turning on a supply of fuel and air to the combustion chamber 102, and providing a source of ignition to ignite the fuel. Turning off the heater 100 may include terminating a supply of fuel and/or air to the heater 100 to extinguish or interrupt the combustion process.

The sensor monitoring module 903 may be configured to monitor various sensors located in or around the heater 100, such as a temperature sensor 912 to detect a temperature of the heater 100, a fuel level sensor 914 to detect an amount of fuel (e.g., wood chips, etc.) in a hopper or other container of the heater 100, an air flow sensor 916 to sense an amount airflow through the heater 100, an emissions sensor 918 to detect exhaust gases and/or other combustion products emitted from the heater 100, a battery status sensor 920 to detect battery characteristics such as battery charge, current, voltage, temperature, etc. of the battery 706, and an air pressure sensor 922 to sense an amount of air pressure within the combustion chamber 102. Other sensors may be utilized as needed.

The fuel dispensing module 904 may be configured to dispense fuel into the heater 100 from a hopper 700 or other container. For example, in certain embodiments, the fuel dispensing module 904 may control a door, auger, or other dispensing mechanism to dispense a desired amount of fuel into the combustion chamber 102. The compressor control module 906, by contrast, may control the compressor 302. For example, the compressor control module 906 may control a speed, frequency of operation, duration of operation, or the like, of the compressor 302. This may be performed to achieve a desired temperature, pressure, air flow, emissions, or the like, within the heater 100. In certain embodiments, this be accomplished with feedback from one or more of the sensors previously discussed. The compressor control module 906 may, in certain embodiments, rotate the compressor 302 independently from the tesla turbine 106 and generator 704, as previously discussed.

The emissions regulation module 908 may, by contrast, be configured to achieve a desired emissions (or lack thereof) from the heater 100. In certain embodiments, this may be accomplished by regulating an amount of fuel, air, or the like that is input to the heater 100. In certain embodiments, the emissions regulation module 908 may control the heater 100 to direct hot combustion gases through the catalytic disks of the tesla turbine 106 when the heater 100 starts operating, thereby heating up the disks faster and reducing a time required for light-off, thereby reducing overall emissions.

The temperature control module 909 may be used to control the temperature of the heater 100. For example, using feedback from a temperature sensor, the temperature control module 909 may control the flow of fuel, air, and or pressure into the heater 100 to achieve a desired temperature. The battery management module 910, by contrast, may manage the battery 706, which may include regulating or controlling one or more of the cooling, charging, discharging, current, voltage, and the like of the battery 706. The flowcharts and/or block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. An apparatus comprising:
a heater comprising a combustion chamber, an inlet port to provide fuel into the combustion chamber, and an outlet port to expel exhaust gases from the combustion chamber;
an exhaust channel operably coupled to the outlet port and configured to convey exhaust gases away from the combustion chamber;
a nozzle incorporated into the exhaust channel and configured to accelerate the exhaust gases therethrough;
a tesla turbine operably coupled to the exhaust channel and configured to generate rotational power from the accelerated exhaust gases, wherein disks of the tesla turbine are coated with a catalytic material to break apart unburned particles in the exhaust gases, and the exhaust channel is configured to route the exhaust gases through the tesla turbine during a time between ignition and light-off of the catalytic material on the disks of the tesla turbine; and
a heat exchange chamber containing the tesla turbine and configured to transfer heat from the tesla turbine and associated exhaust gases into an edifice in which the heat exchange chamber is placed.

2. The apparatus of claim 1, wherein the tesla turbine powers an electrical generator to produce electricity.

3. The apparatus of claim 1, wherein an inside of the nozzle is coated with a catalytic material to break apart unburned particles in the exhaust gases.

4. The apparatus of claim 1, further comprising a compressor to force air into the combustion chamber through the inlet port.

5. The apparatus of claim 4, wherein the tesla turbine and the compressor are rotated independently from one another.

6. The apparatus of claim 1, wherein the nozzle is a de Laval nozzle.

7. The apparatus of claim 1, further comprising an injector to inject water into the exhaust gases at or near a throat of the nozzle.

8. The apparatus of claim 1, wherein the nozzle is configured to accelerate the exhaust gases to supersonic speeds.

9. The apparatus of claim 1, wherein the combustion chamber is an insulated combustion chamber.

10. A method comprising:
receiving, into a combustion chamber, fuel by way of an inlet port;
expelling, from the combustion chamber, exhaust gases by way of an outlet port;

conveying, from the combustion chamber, the exhaust gases through an exhaust channel operably coupled to the outlet port;

accelerating the exhaust gases through the exhaust channel using a nozzle incorporated into the exhaust channel;

generating, using a tesla turbine operably coupled to the exhaust channel, rotational power from the accelerated exhaust gases;

breaking apart unburned particles in the exhaust gases using a catalytic material coated on disks of the tesla turbine, and routing the exhaust gases through the tesla turbine during a time between ignition and light-off of the catalytic material on the disks of the tesla turbine; and using a heat exchange chamber that contains the tesla turbine, transferring heat from the tesla turbine and associated exhaust gases into an edifice in which the heat exchange chamber is placed.

11. The method of claim 10, further comprising utilizing the rotational power to power an electrical generator to produce electricity.

12. The method of claim 10, further comprising breaking apart unburned particles in the exhaust gases using a catalytic material coated on an inside of the nozzle.

13. The method of claim 10, further comprising forcing air into the combustion chamber through the inlet port using a compressor, wherein the tesla turbine and the compressor rotate independently from one another.

14. The method of claim 10, wherein accelerating the exhaust gases using a nozzle comprises accelerating the exhaust gases using a de Laval nozzle.

15. The method of claim 10, further comprising injecting water into the exhaust gases at or near a throat of the nozzle.

16. The method of claim 10, wherein the nozzle is configured to accelerate the exhaust gases to supersonic speeds.

17. The method of claim 10, wherein the combustion chamber is an insulated combustion chamber.

\* \* \* \* \*